Figures 1, 2:
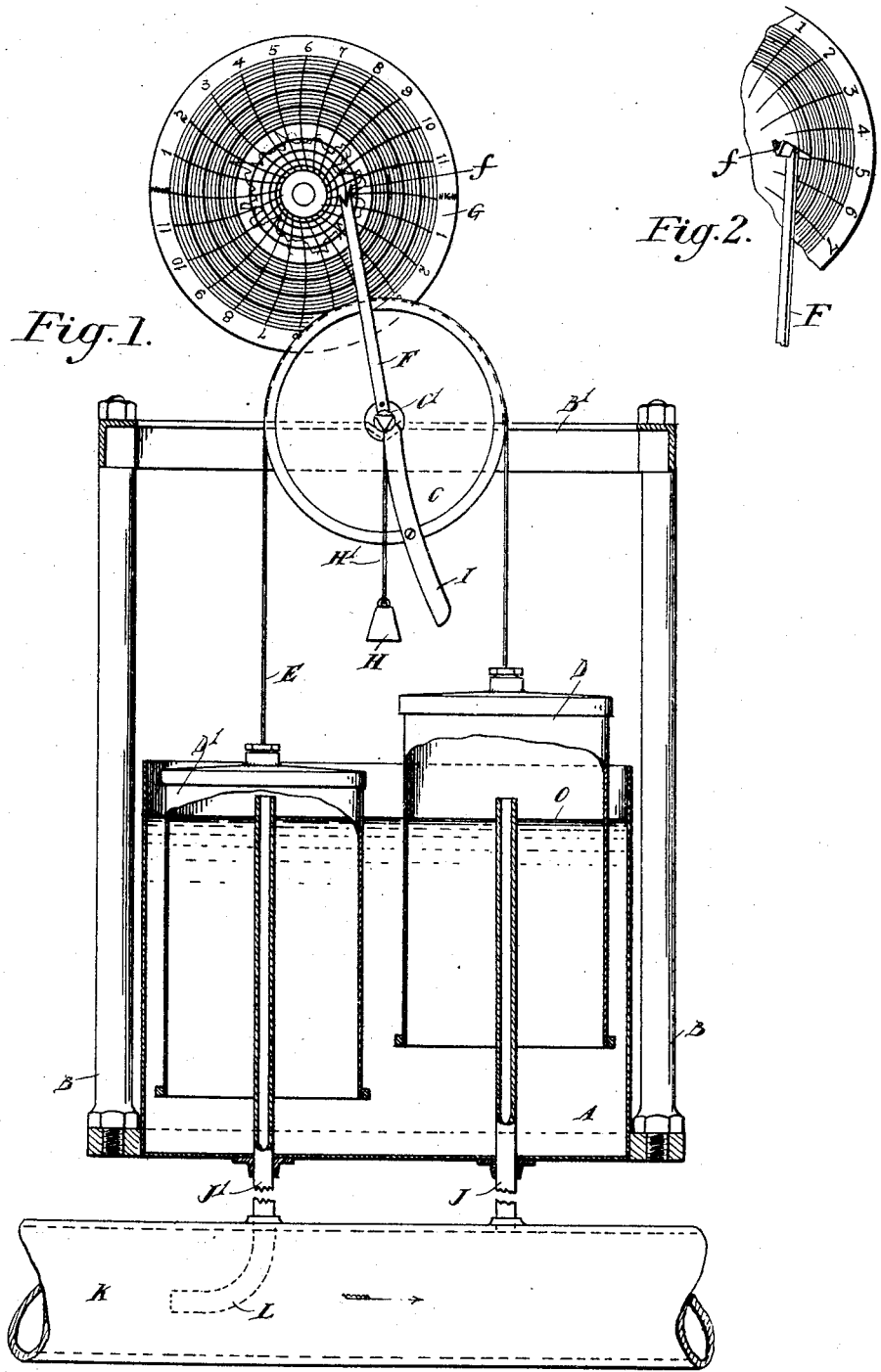

No. 779,685. PATENTED JAN. 10, 1905.
W. S. BLAUVELT.
CURRENT METER.
APPLICATION FILED MAR. 9, 1904.

WITNESSES
INVENTOR
Warren S. Blauvelt
By Parker W Burton Attorneys.

No. 779,685.

Patented January 10, 1905.

UNITED STATES PATENT OFFICE.

WARREN S. BLAUVELT, OF GROSSE ILE, MICHIGAN.

CURRENT-METER.

SPECIFICATION forming part of Letters Patent No. 779,685, dated January 10, 1905.

Application filed March 9, 1904. Serial No. 197,222.

*To all whom it may concern:*

Be it known that I, WARREN S. BLAUVELT, a citizen of the United States, residing at Grosse Ile, county of Wayne, State of Michigan, have invented a certain new and useful Improvement in Current-Meters; and I declare the following to be a full, clear, and exact description of the invention, such as will enable others skilled in the art to which it pertains to make and use the same, reference being had to the accompanying drawings, which form a part of this specification.

My invention relates to current-meters; and the object of my improvements is to provide an improved differential meter which shall indicate and record the velocity of gas.

In the drawings, Figure 1 is an elevation, partly in section, of an apparatus embodying my invention, the main and connections therethrough being indicated. Fig. 2 is a detail view of the end of the pointer F, showing the marking-point thereon.

K is the main or pipe through which a current of gas is passing in the direction indicated by the arrow.

L is a Pitot tube in the pipe K, communicating with the pipe J'.

J is a second pipe communicating with the tube K.

A is a tank in which is placed kerosene-oil, (or other suitable liquid,) its level being indicated by the reference-letter O.

B B are standards, and B' a cross-piece constituting a frame upon which is supported on knife-edges a shaft C'.

C is a disk upon the shaft C'.

The pipes J J' extend through the bottom of the tank A and open at points slightly above the level O of the kerosene in said tank.

D D' are cylindrical bells over the pipes J J' in the tank A, the lower end of said bells extending beneath the surface of the liquid.

E is a cord secured at one end to the bell D' and at the other end to the bell D and passing over the disk C.

F is a pointer extending from the shaft C' or disk C.

G is a chart graduated by concentric circles and by approximately radial lines and rotated by clockwork. The chart G is in a plane parallel to that of the disk C, and there is a marker on the outer end of the pointer F, adapted to mark upon the chart G.

When the bells D D' change their relative positions, the disk C is turned proportionally to that motion, moving the marker on the pointer F approximately radially to the chart G.

I is a cam secured to the disk C or shaft C' and extending approximately radially thereto.

H is a weight secured by a cord or silk filament to the shaft C' at a point concentric therewith. After the disk C has turned a short distance the surfaces of the cam I come against the cord or filament H' to push the weight H a little to one side, and as the disk C turns the points of contact between the cam I and the cord H' come farther and farther from the center, so that the weight H acts at a greater leverage to prevent the turning of the disk C.

The current of gas passing through the pipe K produces a pressure in the Pitot tube L which is proportional to the square of the velocity of the current, and this pressure is conveyed by the pipe J' to the interior of the bell D' above the surfaces of the oil in the tank A. This pressure causes the bell D' to rise, the bell D falling to the same extent, and the movement of the bell D' is proportional to the differences of pressure in the bells D and D', which is that of the ends of the pipes J J', which communicate with the pipe K. The bells D D' are made of considerable diameter and of thin metal, so that a small displacement of oil corresponds to a considerable movement of the bells, and a very slight pressure will exert a considerable aggregate force over the entire area of the cross-section of a bell.

I use kerosene-oil in the tank A, because this fluid keeps the surfaces of the bells wet, so that the concavity of the miniscus is always in the same direction, so that the delicacy of the apparatus is not affected by a change of curvature of the surface. As the pressure in the Pitot tube is proportional to the square of the velocity of the gas, if the movement of the pointer F were proportional to the pressure it would be proportional to the square of the velocity and the graduations upon the chart G to indicate such velocity would be inconveniently far apart. I have therefore changed the graduation upon said disk and provide the cam-surfaces I, weight H, and cord or filament H' and formed the cam-surfaces so that it will provide a resistance which shall cause the pointer to move a distance proportional to the square root of the pressure which causes the rotation.

The opening of the pipe J should be small and directly in the bounding-wall of the main. I use a quarter-inch pipe.

What I claim is—

The combination of a main having a moving fluid therein, a liquid, two bells having their open ends beneath the surface of said liquid, means for movably connecting said bells together so as to balance each other, a pipe opening into each of said bells above the surface of said liquid, and communicating with said main, and a Pitot tube in said main communicating with one of said pipes.

In testimony whereof I sign this specification in the presence of two witnesses.

WARREN S. BLAUVELT.

Witnesses:
WILLIAM M. SWAN,
ELLIOTT J. STODDARD.